United States Patent
Sugiura

(10) Patent No.: US 10,848,082 B2
(45) Date of Patent: Nov. 24, 2020

(54) DRIVING DEVICE AND DRIVING METHOD FOR MOTOR, COOLING DEVICE AND ELECTRONIC MACHINE

(71) Applicant: ROHM CO., LTD., Kyoto (JP)

(72) Inventor: Kenji Sugiura, Kyoto (JP)

(73) Assignee: ROHM CO., LTD., Kyoto (JP)

(*) Notice: Subject to any disclaimer, the term of this patent is extended or adjusted under 35 U.S.C. 154(b) by 20 days.

(21) Appl. No.: 16/100,514

(22) Filed: Aug. 10, 2018

(65) Prior Publication Data

US 2018/0375451 A1    Dec. 27, 2018

Related U.S. Application Data

(63) Continuation of application No. 14/337,461, filed on Jul. 22, 2014, now Pat. No. 10,075,109.

(30) Foreign Application Priority Data

Jul. 22, 2013  (JP) .................................. 2013-152049

(51) Int. Cl.
    *H02P 6/182*     (2016.01)
    *H02P 6/15*      (2016.01)
    (Continued)

(52) U.S. Cl.
    CPC .......... *H02P 6/182* (2013.01); *F04D 25/0606* (2013.01); *F04D 27/004* (2013.01); *H02P 6/15* (2016.02)

(58) Field of Classification Search
    CPC ........... H02P 6/182; H02P 6/15; F04D 27/004
    See application file for complete search history.

(56) References Cited

U.S. PATENT DOCUMENTS 5,225,759 A   7/1993  Endo et al.
5,592,058 A   1/1997  Archer et al.
(Continued)

FOREIGN PATENT DOCUMENTS

JP    10341588 A    12/1998
JP    2007312447 A  11/2007
(Continued)

OTHER PUBLICATIONS

JP Office Action corresponding to Application No. 2013-152049; dated Feb. 28, 2017.

*Primary Examiner* — Cortez M Cook
(74) *Attorney, Agent, or Firm* — Cantor Colburn LLP

(57) ABSTRACT

The present disclosure provides a driving device with a low cost and/or a simple advance angle control for a motor. A voltage zero crossing detecting unit 314 is configured to detect an induced voltage generated from a coil with a specific phase of a fan motor 202 being zero of a voltage zero crossing point. A detection period setting unit 316 is configured to set at least one detection period synchronously with the voltage zero crossing point. A coil voltage detection comparator 302 is configured to compare a terminal voltage generated from one end of the coil with the specific phase with a threshold voltage, and generate a coil voltage detection signal S3 indicating a comparison result. A current phase detecting unit 318 is configured to generate a phase detection signal S8 indicating a relationship between the coil current flowing through the coil with the specific phase and a phase of an induced voltage based on a level of the coil voltage detection signal S3 in the detection period. A driving signal synthesis unit 308 is configured to generate a driving control signal S5 based on the phase detection signal S8.

8 Claims, 6 Drawing Sheets

(51) Int. Cl.
  *F04D 27/00* (2006.01)
  *F04D 25/06* (2006.01)

(56) References Cited

U.S. PATENT DOCUMENTS

| | | | | |
|---|---|---|---|---|
| 5,798,623 | A * | 8/1998 | El-Sadi | H02P 6/06 |
| | | | | 318/400.17 |
| 6,034,493 | A | 3/2000 | Boyd et al. | |
| 6,498,446 | B1 * | 12/2002 | Menegoli | H02P 6/085 |
| | | | | 318/400.12 |
| 6,812,667 | B2 | 11/2004 | Yasohara et al. | |
| 2004/0007998 | A1 | 1/2004 | Yosohara et al. | |
| 2006/0004664 | A1 | 3/2006 | Itagaki et al. | |
| 2006/0132075 | A1 | 6/2006 | Lee et al. | |
| 2006/0170383 | A1 | 8/2006 | Narumi et al. | |
| 2008/0238349 | A1 | 10/2008 | Cheng | |
| 2008/0252238 | A1 | 10/2008 | Otagura | |
| 2008/0252240 | A1 | 10/2008 | Sugie | |
| 2009/0108784 | A1 | 4/2009 | Sakamoto et al. | |
| 2009/0174350 | A1 * | 7/2009 | Kuroda | H02M 7/53875 |
| | | | | 318/400.11 |
| 2009/0189556 | A1 * | 7/2009 | Itagaki | H02P 6/182 |
| | | | | 318/400.11 |
| 2009/0289588 | A1 | 11/2009 | Miyagoe et al. | |
| 2010/0028164 | A1 | 2/2010 | Matsui | |
| 2010/0109589 | A1 | 5/2010 | Harada | |
| 2010/0177626 | A1 | 7/2010 | Otaguro | |
| 2011/0279070 | A1 | 11/2011 | Tanaka et al. | |
| 2011/0298398 | A1 | 12/2011 | Mitomo et al. | |

FOREIGN PATENT DOCUMENTS

| | | |
|---|---|---|
| JP | 2010004733 A | 1/2010 |
| JP | 2012200092 A | 10/2012 |
| JP | 2004048951 A | 2/2014 |

* cited by examiner

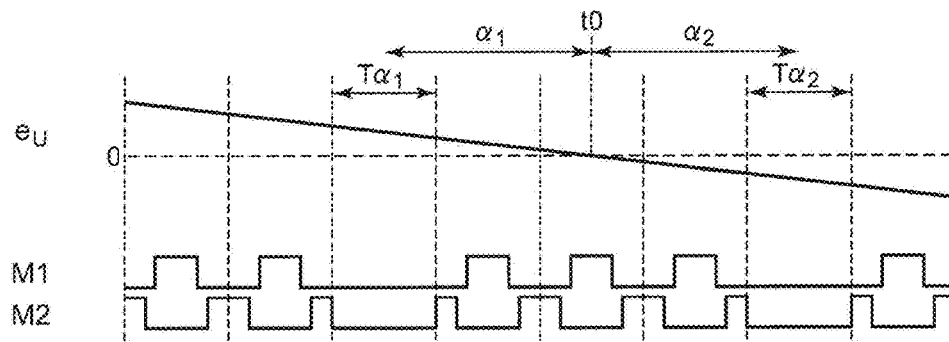
FIG. 5A
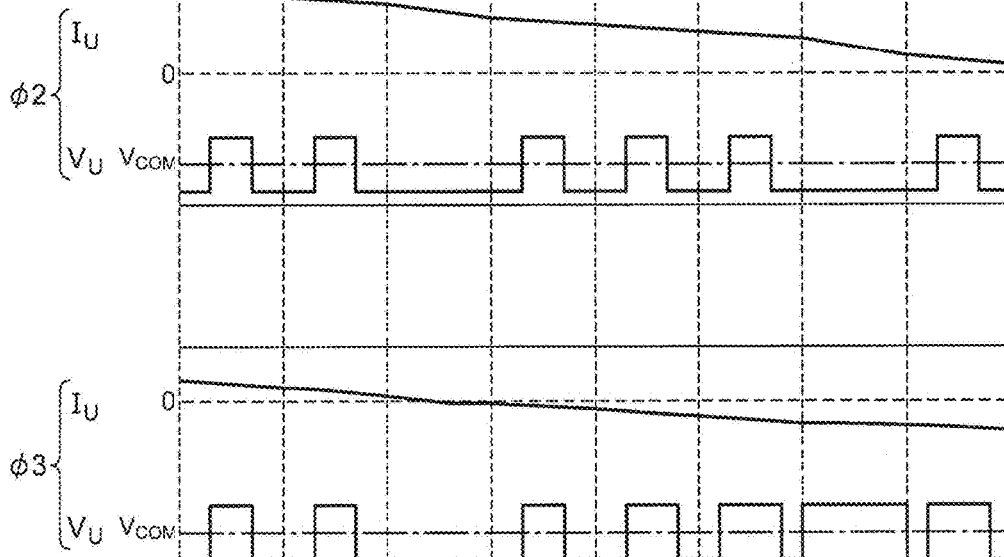
FIG. 5B
FIG. 5C
FIG. 5D

DRIVING DEVICE AND DRIVING METHOD FOR MOTOR, COOLING DEVICE AND ELECTRONIC MACHINE

CROSS REFERENCE TO RELATED APPLICATIONS

The present application is a continuation application of U.S. patent application Ser. No. 14/337,461, filed on Jul. 22, 2014, the entire contents of which are incorporated herein by reference and priority to which is hereby claimed. Priority under 35 U.S.C. § 119(a) and 35 U.S.C. § 365(b) is hereby claimed from Japanese Application No. 2013-152049, filed Jul. 22, 2013, the disclosures of which are both also incorporated herein by reference.

BACKGROUND

The present disclosure is related to a motor driving technology.

FIG. 1 shows a model diagram of a three-phase brushless direct current (DC) motor 500. The motor 500 includes: respective stator cores 502 for U-phase, V-phase and W-phase; a stator including stator coils (hereafter referred to as coils) $L_U$, $L_V$ and $L_W$ reeled in an activator core; and a magnetic rotor 504 having a permanent magnet.

The coils $L_U$, $L_V$ and $L_W$ are in sequence powered (also called phase switch) by a driving circuit (not shown), such that a winding field 506 produced by the stator rotates. The winding field is applied on the magnetic rotor 504, so as to rotate the magnetic rotor 504.

It is well known that when the torque of the motor at the winding field 506 and the magnetic rotor 504 substantially have the relationship in position as shown in FIG. 1, more specifically, when winding field 506 is orthogonal to the magnetic rotor 504, the torque of the motor is the greatest.

If an equivalent circuit of an inductor L and a resistor R is accounted for a motor, formula (1) is established between a coil current i(t), a voltage V (also called applied voltage, driving voltage) between terminals, and an induced voltage e (also called counter electromotive force).

$$V-e=R\cdot i+L\cdot di/dt=(R+j\omega L)\cdot i \quad (1)$$

Formula (2) is obtained by varying formula (1).

$$i=(V-e)/(R+j\omega L)=(V-e)\cdot(R-j\omega L)/(\omega^2 L^2+R^2) \quad (2)$$

In other words, the phase of the coil current i is varied according to a composite vector (V-e) of the driving voltage V and the induced voltage e and the resistance of the motor (jωL+R). Specifically, the phase of the coil current has a delay θ=arctan(ωL/R) relatively to the composite vector (V-e) of the driving voltage V and the induced voltage e.

FIG. 2A shows the relationship among the driving voltage, the induced voltage, and the current flowing through the coil of a predetermined phase. The left drawing of FIG. 2A shows the status that the driving voltage V is generated with the same phase as the induced voltage e. In the status, the phase of the coil current i delays relatively to the induced voltage e.

The right drawing of FIG. 2A shows the status that the driving voltage V leads the induced voltage e. In the status, the coil current i and the induced voltage e have the same phase, so as to obtain a high torque.

FIG. 2B is a vector diagram showing the phase relationship of the right drawing of FIG. 2A. In order to make the induced voltage e and the coil current i have the same phase, the composite vector (V-e) of the induced voltage e and the driving voltage V shall have a θ delay relatively to the coil current i, and the amplitude and the phase of the driving voltage V are regulated in such way.

Herein, the induced voltage e is proportional to the turning number ω of the motor, and the phase leading angle θ affected by the resistance of the motor is varied instantaneously according to the turning number ω of the motor. Therefore, in order to obtain the maximal torque, the amplitude and the phase of the driving voltage V have to be instantaneously varied according to the turning number ω of the motor. It is also called a leading angle control since the phase of the driving voltage V leads the phase of the induced voltage e.

BRIEF SUMMARY OF THE INVENTION

In order to optimize the driving voltage V, the following two methods are considered.

In the first method, the phase of the induced voltage e and the phase of the current i of the coil current are detected. Since the phase of the induced voltage e corresponds to the position of the rotor, the phase of the induced voltage e can be detected by a rotor position detector such as a Hall element. Further, the phase of the coil current i is detected by a current detector such as a current transformer, and the phase of the driving voltage V is regulated based on such information. In the first method, it is an issue that the current detector is expensive.

In the second method, the relationship between the frequency or level of the driving voltage V and the phase angle is set in advance, and the phase angle is regulated by an open loop based on the instant frequency or level of the driving voltage V. In this method, it is more complicated that each type of the motor or even each motor has to be set individually, and the precision issue is to be considered.

The present disclosure is achieved by the following conditions. It is an exemplary object of the present disclosure to provide a motor driving device with low cost and/or a simple leading angle control.

It is an aspect of the present disclosure to provide a driving device for a brushless DC motor having at least one coil. The driving device includes: a voltage zero crossing detection unit for detecting a voltage zero crossing point at which an induced voltage is generated by a coil under a predetermined phase of a brushless DC motor; a detection period setting unit for setting at least one detection period synchronously at the voltage zero crossing point; a coil voltage detection comparator for comparing a terminal voltage generated at one end of the coil under a predetermined phase and a threshold voltage, and generating a coil voltage detection signal indicating a comparison result; a current phase detecting unit for generating a phase detection signal indicating the relationship between the phase of the coil current flowing in the coil under the predetermined phase and the phase of the induced voltage based on a level of the coil voltage detection signal of the detection period; a driving signal synthesis unit for generating a driving control signal based on the phase detection signal; and a driving circuit for driving a brushless DC motor based on the driving control signal and allowing one end of the coil under the predetermined phase to be in the status of high resistance in the detection period.

If one end of the coil is in a high resistance status around, before or after the voltage zero crossing point, the terminal voltage is around ground level when the current flows through the coil in the direction from the driving circuit to the coil (also called a source-out direction), and the terminal voltage is around the power source voltage level when the current flows through the coil in the direction from the coil to the driving circuit (drain-in direction). It means that the direction of the coil current can be determined based on the terminal voltage. In other words, the phase of the coil current can be identified, and can be reflected on the phase switch control of the driving voltage. Alternatively, the detection period setting unit and the voltage zero crossing point synchronously set a first detection period with a first predetermined angle leading the voltage zero crossing point, and a second detection period with a second predetermined angle lagging the voltage zero crossing point. The phase detection signal is generated by the current phase detecting unit based on the combination of the levels of the respective coil voltage detection signals from the first detection period and the second detection period.

In this situation, when the coil current in the first detection period and the second detection period is flowing in the source-out direction, it can be determined that the phase of the coil current lagging the phase of the induced voltage. When the coil current in the first detection period and the second detection period is flowing in the drain-in direction, it can be determined that the phase of the coil current leading the phase of the induced voltage.

The current phase detecting unit may also be configured to determine one of that (i) a current zero crossing point of a coil current zero crossing is positioned in a first status leading the first detection period, (ii) a current zero crossing point is positioned in a second status lagging the second detection period, and (iii) a current zero crossing point is positioned in a third status lagging the first detection period and leading the second detection period. The driving signal synthesis unit is configured to (i) delay a timing of the phase switch for a predetermined first adjusting angle relatively to the instant timing of the phase switch under a first status; (ii) advance a timing of the phase switch for a second adjust angle relatively to the instant timing of the phase switch under a second status; and (iii) maintain a timing of the phase switch as the instant timing of the phase switch under a third status.

In addition to the first detection period and the second detection period, the detection period setting unit can also set a third detection period leading the first detection period for a third predetermined angle and a fourth detection period lagging the second detection period for a fourth predetermined angle. Based on the combination of levels of coil voltage detection signals from the first detection period to the fourth detection period, the current phase detecting unit determines one of that (i) the current zero crossing point of the coil current zero crossing is positioned in a first status leading the third detection period, (ii) the current zero crossing point is positioned in a second status lagging the third detection period and leading the first detection period, (iii) the current zero crossing point is positioned in a third status lagging the fourth detection period, (iv) the current zero crossing point is positioned in a fourth status lagging the second detection period and leading the fourth detection period, and (v) the current zero crossing point is positioned in a fifth status between the first detection period and the second detection period. The driving signal synthesis unit is configured to (i) delay a timing of the phase switch for a first adjusting angle relatively to the instant timing of the phase switch in the first status; (ii) delay a timing of the phase switch for a second adjusting angle relatively to the instant timing of the phase switch in the second status; (iii) make a timing of the phase switch advanced for a third adjusting angle relatively to the instant timing of the phase switch in the third status; (iv) make the timing of the phase switch advanced for a fourth adjusting angle relatively to the instant timing of the phase switch in the fourth status; and (v) maintain a timing of the phase switch as the instant timing of the phase switch in the fifth status.

In this situation, the phase information of the coil current can be precisely obtained.

The first adjusting angle can be larger than the second adjusting angle, and the third adjusting angle can be larger than the fourth adjusting angle.

In this situation, when the phase shift of the coil current is larger, the phase of the driving voltage can be varied with a larger angle, and when the phase shift of the coil current is smaller, the phase of the driving voltage can be varied with a smaller angle. Hence, the control speed is increased, and/or the precision is enhanced.

The driving signal synthesis unit can also advance (i) the timing of the phase switch for a predetermined angle relatively to the instant timing of the phase switch when the phase detection signal indicates that the phase of the coil current lagging the phase of the induced voltage.

The driving signal synthesis unit delay (ii) the timing of the phase switch for a predetermined angle relatively to the instant timing of the phase switch when the phase detection signal indicates that the phase of the coil current leading the phase of the induced voltage.

The threshold voltage can also be a midpoint voltage of a multi-phase coil. The threshold voltage can also be a divided voltage of the power source voltage and the ground voltage.

The voltage zero crossing detecting unit can also include a Hall comparator for comparing a pair of Hall signals, which are from a Hall element and indicate a location of a rotor of the brushless DC motor, and generating a Hall detection signal.

The voltage zero crossing detecting unit can also include a counter electromotive force detection comparator for comparing the terminal voltage and the midpoint voltage of the coil when the terminal of the coil with a predetermined phase of the brushless DC motor is in the status of high resistance.

The brushless DC motor can also be a fan motor.

It is another aspect of the present disclosure to provide a cooling device. The cooling device can also include: a fan motor; and any one of the preceding driving devices for driving the fan motor.

It is another aspect of the present disclosure to provide an electronic machine. The electronic machine can also include the above cooling device.

Further, any combination of the above elements or replacements of the elements, methods, devices and systems of the present disclosure are also effective.

According to an embodiment of the present disclosure, the cost is lowered, and/or the advance angle control is simply performed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5A to FIG. 5D are waveform diagrams showing the detection of the current phase of the driving device in accordance with some embodiments.

DETAILED DESCRIPTION

Figure 1:
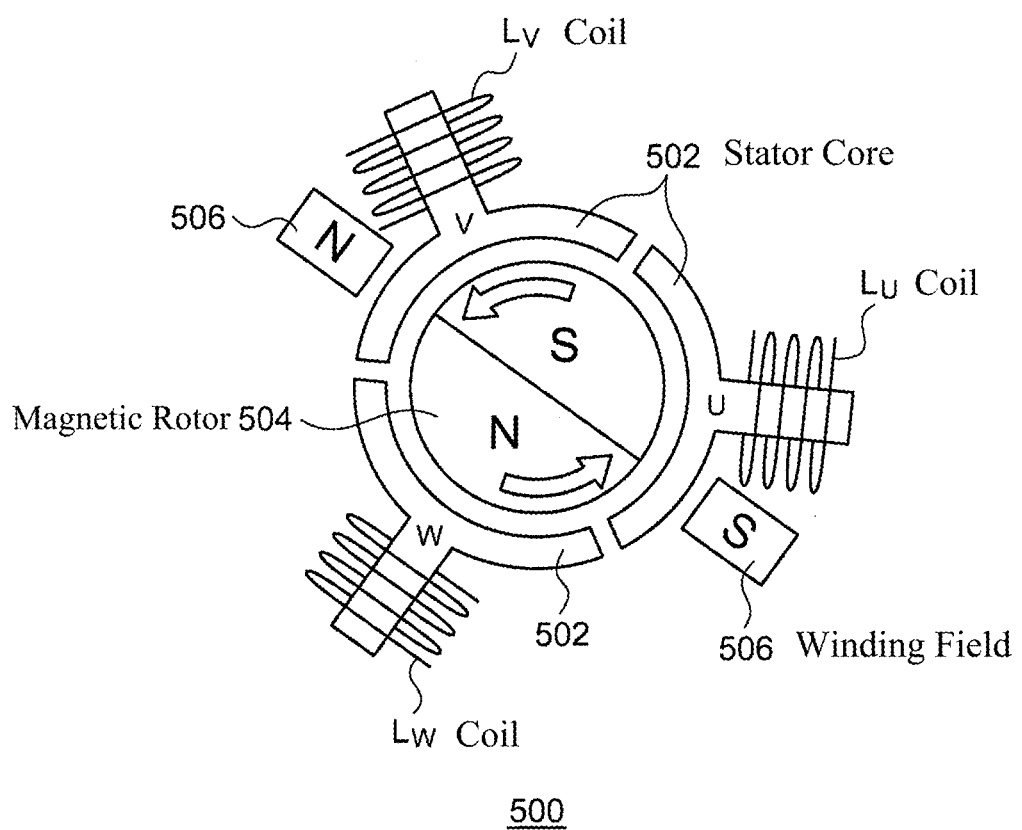
FIG. 1 shows a model diagram of a three-phase brushless DC motor in accordance with some embodiments.
Figure 2A:
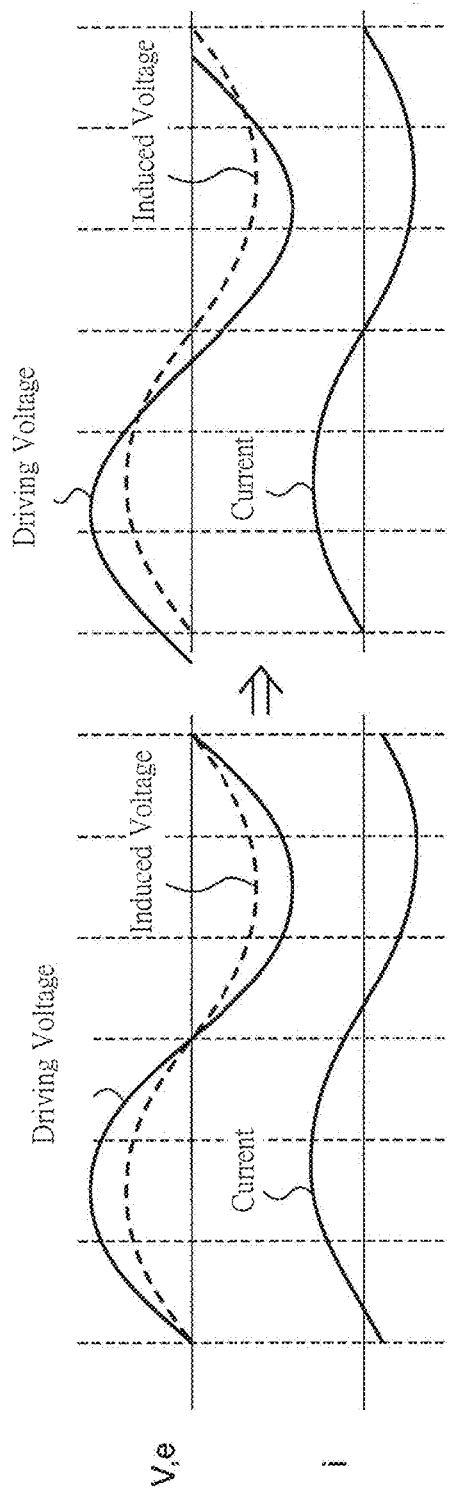
FIG. 2A is a drawing showing the relationship among a driving voltage, an induced voltage, and current flowing through the coil of a predetermined phase.
Figure 2B:
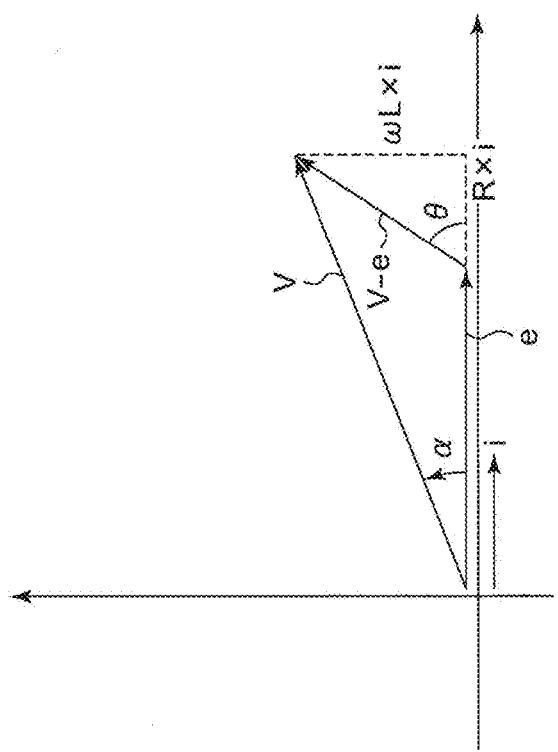
FIG. 2B is a vector diagram showing the phase relationship shown in the right drawing of FIG. 2A in accordance with some embodiments.

The present disclosure is illustrated in the following descriptions based on embodiments and referring to drawings. The same or equivalent configuration elements, components and processing steps have the same reference numerals, and the repeated descriptions are omitted adequately. Further, embodiments are exemplary and not intended to limit the present disclosure. All features in the embodiments and combinations thereof are not necessary for the nature of the present disclosure.

In the specification of the present application, "connection status between a component A and a component B" is referred to that the component A is physically in direct contact with the component B, and also includes the indirect connection that other components may be disposed between the component A and the component B without substantially affecting the electrical connection status and damaging the efficacy or effects of the combination of the components.

Similarly, "a component C disposed between a component A and a component B" is referred to the direct connection of the component A and the component C or the direct connection of the component B and the component C, and also includes the indirect connection that other components may be disposed between the component A and the component B without substantially affecting the electrical connection status and damaging the efficacy or effects of the combination of the components.

Figure 3:
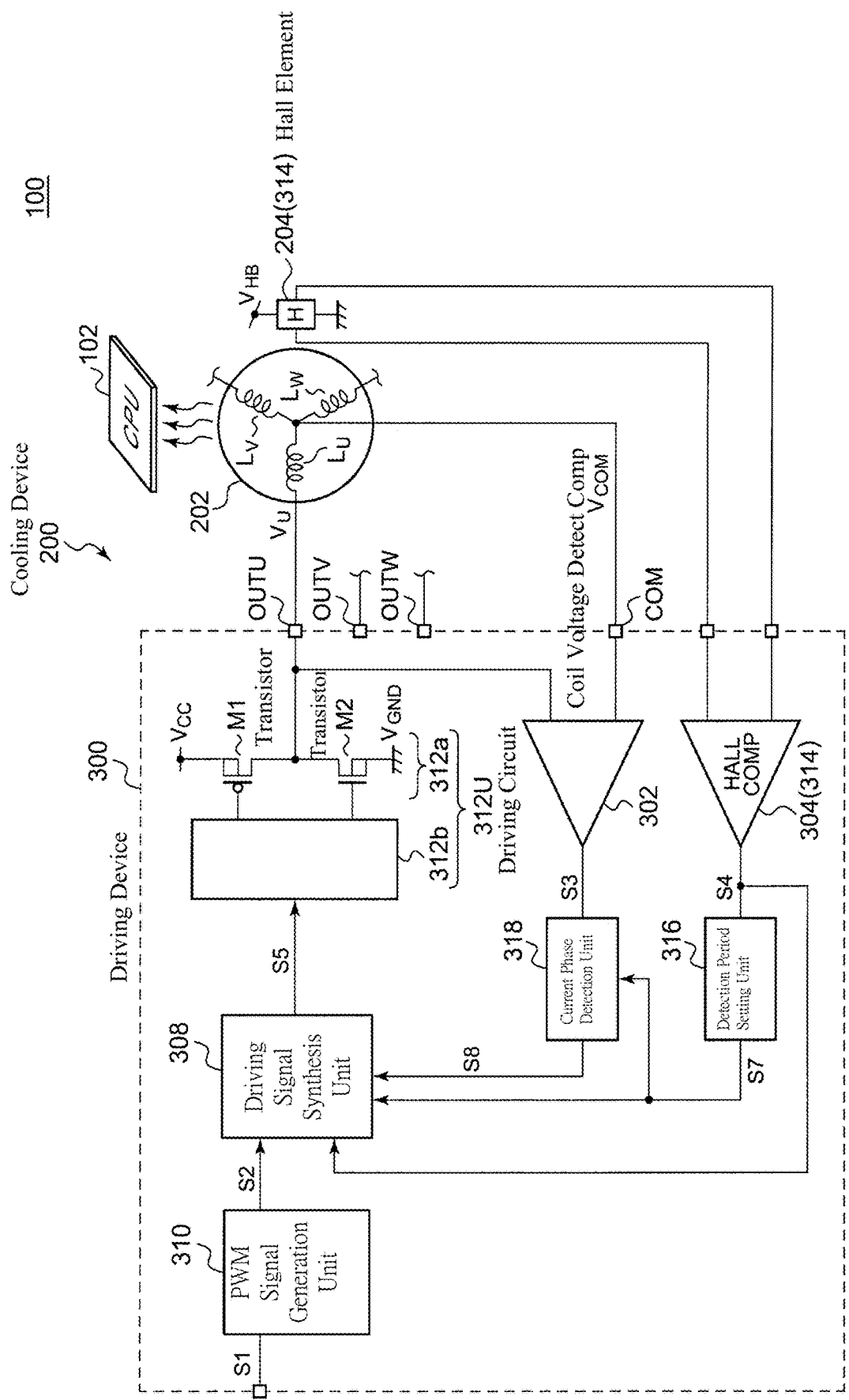
FIG. 3 is a block diagram showing an electronic machine having a cooling device in accordance with some embodiments.

FIG. 3 is a block diagram showing an electronic machine 100 having a cooling device 200 in accordance with some embodiments. The electronic machine 100 is a computer such as a personal computer, a work station and so on, or a home electrical appliance such as a refrigerator or TV. The object to be cooled includes CPU 102, for example. The CPU 102 is cooled via air blowing by the cooling device 200.

The cooling device 200 includes a fan motor 202, a Hall element 204 and a driving device 300. The fan motor 202 is a three-phase brushless DC motor disposed in proximity to the CPU 102 to be cooled. The fan motor 202 is driven by the driving device 300 based on a control input signal (hereafter called a control signal) S1 indicating a torque (turning number or applying voltage) of the fan motor 202. The cooling device 200 is formed as a module, and commercially distributed.

The fan motor 202 includes coils $L_U$, $L_V$ and $L_W$ with U-phase, V-phase and L-phase of a star-shaped wiring, and a permanent magnet (not shown). The Hall element 204 is installed on a specific position of the fan motor 202, and generates a pair of Hall signals, VH+ and VH−, indicating a location of a rotor of the fan motor 202. The Hall element 204 is provided with a Hall bias voltage $V_{HB}$ from the driving device 300. In the cooling device 200 of this embodiment, the Hall element 204 is only prepared for one phase rather than for all three phases of the coils.

The driving device 300 is a functional integrated circuit established on a semiconductor substrate, providing the power source terminal VCC with the power source voltage $V_{CC}$, and the ground terminal GND with ground voltage. Further, the output terminals OUTU~OUTW of the driving device 300 are connected to one end of the coils $L_U$, $L_V$ and $L_W$ of the fan motor 202, and a midpoint voltage $V_{COM}$ of the fan motor 202 is input to the common terminal (COM).

The driving device 300 includes a coil voltage detection comparator 302, a Hall comparator 304, a driving signal synthesis unit 308, a PWM (Pulse-Width Modulation) signal generating unit 310, a driving circuit 312, a detection period setting unit 316, and a current phase detection unit 318.

A voltage zero crossing detecting unit 314 is formed by the Hall comparator 304 and the Hall element 204. The Hall comparator 304 can also be integrated in a Hall IC including the Hall element 204. The voltage zero crossing detecting unit 314 is configured to detect a voltage zero crossing point where an induced voltage e becomes zero on the coil $L_U$ with a predetermined phase U of the fan motor 202. Specifically, the Hall comparator 304 compares a pair of Hall signals, H+ and H−, indicating a location of a rotor from the Hall element 204, and generates a Hall detection signal S4. The Hall detection signal S4 makes the level shift for each voltage zero crossing point.

At least one detection period is set by the detection period setting unit 316, synchronously with the Hall detection signal S4, before and/or after the voltage zero crossing point, or in a way including the voltage zero crossing point. In this embodiment, a first detection period is set before the voltage zero crossing point by the detection period setting unit 316, and a second detection period is set after the voltage zero crossing point. An effective timing signal S7 (high level, for example) is generated in each of the first detection period and the second detection period by the detection period setting unit 316.

The terminal voltage $V_U$ generated at one end of the coil $L_U$ with a predetermined phase U and the threshold voltage are compared by the coil voltage detection comparator 302, and a coil voltage detection signal S3 indicating the comparison result is generated. In this embodiment, the threshold voltage is the midpoint voltage $V_{COM}$ of the fan motor 202.

The timing signal S7 is received by a current phase detecting unit 318. The phase relationship between the coil current $I_U$ flowing through the coil $L_U$ with a predetermined phase U and the induced voltage $e_U$ is determined by the current phase detecting unit 318 based on a level of the coil voltage detection signal S3 of a period at which the timing signal S7 is effective, i.e. the detection period set by the detection period setting unit 316, and a phase detection signal S8 indicating the determination result is generated.

A control signal S1 indicating a torque, a turning number or an applying voltage of the fan motor 202 is received externally by a PWM signal generating unit 310, and a PWM signal S2 which is pulse modulated is generated according to the control signal S1. The duty cycle of the PWM signal S2 varied according to the control signal S1. The pulse modulated control signal S1 is input to the PWM signal generating unit 310 from the outside of the driving device 300 according to the target torque of the motor, and the control signal S1 is directly used as the PWM signal S2 to be output. Alternatively, an analog voltage can be received by the PWM signal generating unit 310 corresponding to the peripheral temperature Ta obtained by a thermistor, and a PWM signal S2 having a duty cycle corresponding to the analog voltage is generated. Alternatively, a digital signal indicating the duty cycle can be received from a processor such as the CPU, and the PWM signal S2 corresponding to the digital signal can be generated by the PWM signal generating unit 310.

In addition to the PWM signal S2 and the Hall detection signal S4, the driving control signals $S5_U$, $S5_V$ and $S5_W$ for each of the U phase, V phase and W phase are generated by the driving signal synthesis unit 308 based on the timing signal S7 and the phase detection signal S8.

Further, the phase switch control is performed by the driving signal synthesis unit 308 based on the Hall detection signal S4 and the phase detection signal S8. In other words, the phase advance angle (or phase delay angle) is determined by the driving signal synthesis unit 308 based on the phase detection signal S8, and the phase switch is performed by shifting the timing for the phase advance angle (phase delay angle) relatively to the voltage zero crossing point indicated by the Hall detection signal S4. Still in other words, the phase detection signal S8 is reflected on the timing of the phase switch by the driving signal synthesis unit 308, such that the phase relationship between the coil current $I_U$ and the induced voltage e approaches to a specific relationship (the same phase, for example). Further, a driving control signal S5 is generated in the detection period, at which the timing signal S7 is effective, by the driving signal synthesis unit 308 in a manner that one end of the coil $L_U$ with a predetermined phase is in a high resistance status.

Driving voltages $V_U$, $V_V$ and $V_W$ are applied on one end of the respective coils $L_U$, $L_V$ and $L_W$ by the driving circuit 312, according to the driving control signals $S5_U$, $S5_V$ and $S5_W$. FIG. 3 only shows the driving circuit 312U with the U-phase, and the V- and W-phases are omitted.

The PWM (switching) driving or BTL (Bridged Transless) driving can be performed on the fan motor 202 by the driving circuit 312.

In the PWM driving, the driving voltages $V_U$, $V_V$ and $V_W$ are switched on and off with the power source voltage $V_{CC}$ and the ground voltage $V_{GND}$, so as to implement the pulse modulation. The target torque (target turning number) is reflected on the duty cycle of each driving voltage. Further, in order to inhibit noise during the phase switch, the duty cycle of each driving voltage is gradually changed during the phase switch. The driving circuit 312 for the PWM driving includes a three-phase bridging circuit. The driving circuit 312 for the PWM driving can also include a bridging circuit 312a and a pre-driver 312b.

In the BTL driving, the envelop of the driving voltages $V_U$, $V_V$ and $V_W$ gradually shifts between the power source voltage $V_{CC}$ and the ground voltage $V_{GND}$. The envelop of the driving voltage for each phase is shifted based on a sinusoidal wave, a quasi-sinusoidal wave, or a trapezoidal wave, so as to realize a lower noise than using the PWM driving. The waveform of the envelop can also be generated according to drawings or the Hall signals $VH_+$ and $VH_-$. The driving voltage for each phase can be pulse modulated by the duty cycle corresponding to the target torque (target turning number). The driving circuit 312 driven by the BTL driving includes amplifiers 312b respectively disposed at the U-phase, V-phase and W-phase. The output segment of each amplifier 312b includes a push-pull typed bridging circuit 312a.

Further, the driving signal synthesis unit 308 and the driving circuit 312 are configured by well-known technology, and there is no limitation to the configuration and driving method thereof.

Further, in the detection period, the driving circuit 312 makes one end of the coil $L_U$ at a predetermined phase to be in a high resistance status. Specifically, the high voltage side transistor M1 and the low voltage side transistor M2 of the bridging circuit 312a are cut out.

The configuration of the cooling device 200 is illustrated in the above descriptions, and the action thereof is illustrated in the following descriptions.

Figure 4A:
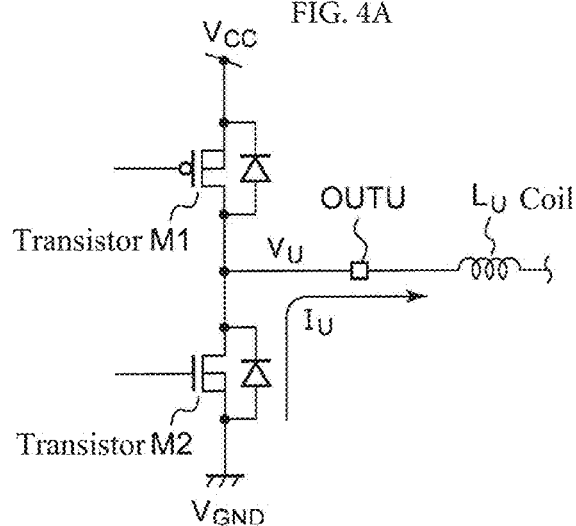
FIG. 4A and FIG. 4B are circuit diagrams showing statuses of a driving circuit in the detection period in accordance with some embodiments.
Figure 4B:
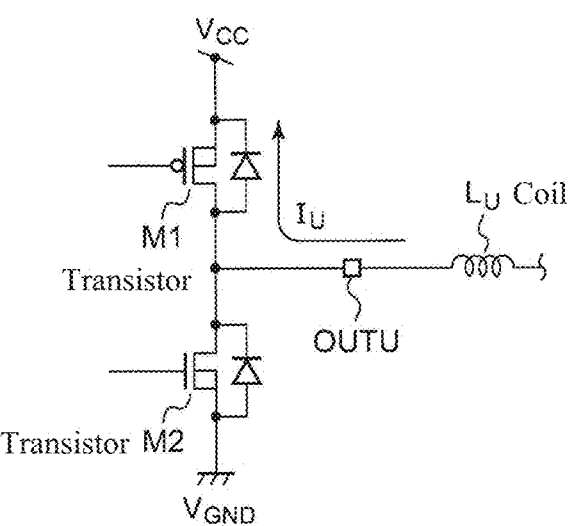

FIG. 4A and FIG. 4B circuit diagrams showing the status of the driving circuit 312 in the detection period.

In the detection period, the high voltage side transistor M1 and the low voltage side transistor M2 are both cut out, and the output terminal OUTU is in a status of high resistance. FIG. 4A shows the status of the coil current $I_U$ flowing in a direction (called a source-out direction) from the driving circuit 312 to the coil $L_U$ in the detection period. At this time, the coil current $I_U$ flows through the body diode of the low voltage side transistor M2. Hence, the terminal voltage $V_U$ becomes around the ground voltage $V_{GND}$.

FIG. 4B shows the status of the coil current $I_U$ flowing in a direction (called a drain-in direction) from the coil $L_U$ to the driving circuit 312. At this time, the coil current $I_U$ flows through the body diode of the high voltage side transistor M1. Hence, the terminal voltage $V_U$ becomes around the power source voltage $V_{CC}$.

Figure 4C:
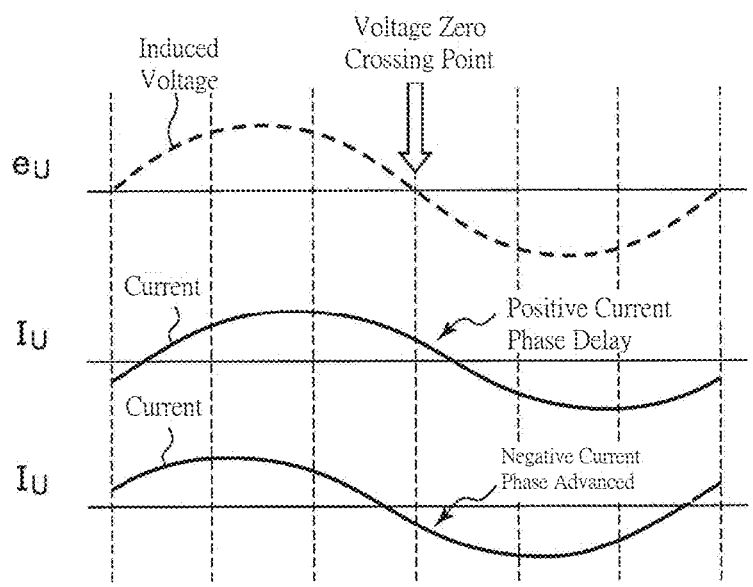
FIG. 4C is a waveform diagram showing the relationship between the phase of the coil current $I_U$ and the induced voltage $e_U$.

By using this property, the direction, i.e. the phase, of the coil current $I_U$ is determined by the coil voltage detection comparator 302 based on the terminal voltage $V_U$ in the detection period. Specifically, the terminal voltage $V_U$ and the threshold voltage $V_{COM}$ are compared. The coil current $I_U$ is determined to be positive, and the phase of the coil current is lagging when $V_U < V_{COM}$. The coil current $I_U$ is determined to be negative, and the phase of the coil current is leading when $V_U > V_{COM}$. FIG. 4C is a waveform diagram showing the relationship between the phase of the coil current $I_U$ and the induced voltage $e_U$.

For ease of understanding, consider the the detection period and the voltage zero crossing point to be consistent. When the coil current is positive, i.e. flowing in the source-out direction, at the voltage zero crossing, and therefore $V_U < V_{COM}$, it is deduced that the phase of the current is delayed. On the contrary, when the coil current is negative, i.e. flowing in the drain-in direction, at the voltage zero crossing, and therefore, $V_U > V_{COM}$, it is deduced that the phase of the current is advanced.

FIG. 5A to FIG. 5D are waveform diagrams showing the detection of the current phase by using the driving device 300. FIG. 5A shows the status of the induced voltage $e_U$, the high voltage side transistor M1 and the low voltage side transistor M2. The high voltage side transistor M1 and the low voltage side transistor M2 are switched on and off in complementary to each other according to the PWM signal S2. The time at which the voltage zero crossing point is generated is set as $t_0$.

In this embodiment, a first detection period Td1 is set for a first predetermined angle $\alpha_1$ leading the voltage zero crossing point $t_0$, and a second detection period Td2 is set for a second predetermined angle $\alpha_2$ lagging the voltage zero crossing point $t_0$ by the detection period setting unit 316 synchronously with the voltage zero crossing point $t_0$. Further, a phase detection signal S8 is generated by the current phase detecting unit 318 based on a combination of levels of the coil voltage detection signal S3 from the first detection period Td1 and the second detection period Td2.

FIG. 5B and FIG. 5C show the coil current $I_U$ and the terminal voltage $V_U$. FIG. 5B shows the waveform while the phase of the coil current $I_U$ is lagging, FIG. 5C shows the waveform while the coil current $I_U$ and the induced voltage e have the same phase, and FIG. 5D shows the waveform while the phase of the coil current $I_U$ is leading.

As shown in FIG. 5B, it is determined by the current phase detecting unit 318 that the phase of the coil current is lagging when the zero crossing point of the coil current $I_U$ (hereafter called a current zero crossing point) is lagging the second detection period Td2 when in both the first detection period Td1 and the second detection period Td2, $V_U < V_{COM}$.

Further, as shown in FIG. 5C, it is determined by the current phase detecting unit 318 that the phase of the coil current $I_U$ and the induced voltage e have the same phase when, $V_U > V_{COM}$ in the first detection period Td1 and $V_U < V_{COM}$ in the second detection period Td2 because the current zero crossing point is positioned between the first detection period Td1 and the second detection period Td2, i.e. around the voltage zero crossing point.

Further, as shown in FIG. 5D, it is determined by the current phase detecting unit 318 that the phase of the coil current $I_U$ is leading when the current zero crossing point is leading the first detection period Td1, when $V_U > V_{COM}$ in both the first detection period Td1 and the second detection period Td2.

The current phase detecting unit 318 determines one of that (i) the current zero crossing point is in a first status Φ1 leading the first detection period as shown in FIG. 5D; (ii) the current zero crossing point is in a second status Φ2 lagging the second detection period Td2 as shown in FIG. 5B; and (iii) the current zero crossing point is in a third status Φ3 lagging the first detection period Td1 and leading the second detection period Td2.

Then, when it is determined by the current phase detecting unit 318 that the phase of the coil current $I_U$ is in the second status Φ2 and is lagging as shown in FIG. 5B, the timing of the phase switch, i.e. the phase of the driving voltage, is advanced by the driving signal synthesis unit 308 for a first adjusting angle $\theta_{ADJ1}$ relatively to the instant timing.

Further, when it is determined by the current phase detecting unit 318 that the phase of the coil current $I_U$ is in the first status Φ1 and is leading as shown in FIG. 5D, the timing of the phase switch, i.e. the phase of the driving voltage, is delayed by the driving signal synthesis unit 308 for a second adjusting angle $\theta_{ADJ2}$ relatively to the instant timing.

Further, when it is determined by the current phase detecting unit 318 that the coil current $I_U$ is in the third status Φ3 and has the same phase as the induced voltage $e_U$ as shown in FIG. 5C, the timing of the phase switch, i.e. the phase of the driving voltage, is maintained as the instant timing.

Further, the first predetermined angle $\alpha_1$ and the second predetermined angle $\alpha_2$ can be the same or different. Similarly, the first adjusting angle $\theta_{ADJ1}$ and the second adjusting angle $\theta_{ADJ2}$ can be the same or different.

By the repeating the above operations, feedback is performed to cause the phase of the coil current $I_U$ and the phase of the induced voltage $e_U$ to be the same and therefore, the fan motor 202 is driven with high efficiency and/or high torque.

The operations of the cooling device 200 having the driving device 300 are illustrated above.

According to the driving device 300, the detection periods are set before and after the voltage zero crossing point, and the direction, i.e. the phase, of the coil current $I_U$ is detected according to the terminal voltage $V_U$ of the detection periods, so as to control the phase switch.

In comparison with the first method, there is no need to use a current mutual inductors for detecting the phase of the coil current $I_U$ in the driving device 300, and hence a driving device with a lower cost and a smaller area than a conventional driving device is realized.

Further, it is the same as the second method which uses an open loop control. There is no need to individually set every type or each of motors, and therefore a simple phase advancing control with high precision is achieved.

Particularly, two detection periods are set respectively before and after the voltage zero crossing point, such that the phase lead or phase lag of coil current is precisely determined according to the combination of values of the coil voltage detection signals S3 in the detection periods.

Further, since the stable point of the phase of the coil current $I_U$ is positioned between the first predetermined angle $\alpha_1$ and the second predetermined angle $\alpha_2$, the position thereof may be adjusted by adjusting the first predetermined angle $\alpha_1$ and the second predetermined angle $\alpha_2$.

The foregoing illustrates embodiments of the present disclosure. The embodiments are exemplary, and persons skilled in the art should appreciate that various modifications may be made to any combination of each essential element or processing step of the embodiments, and the variations also fall within the scope of the present disclosure. The examples of the various modifications are illustrated in the following descriptions.

(First Varied Example)

In the embodiment, it is illustrated that two detection periods are set, but the number of the detection periods are arbitrary. In the first varied example, four detection periods are set.

Figure 6:
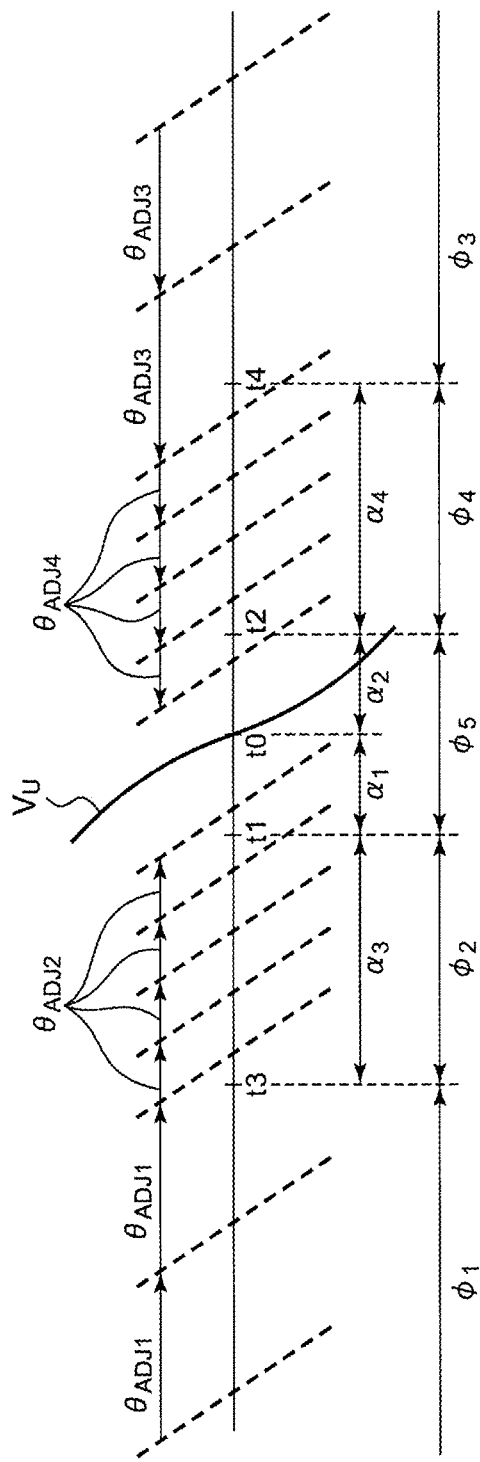
FIG. 6 is a diagram showing the detection period according to First Example.

FIG. 6 shows the detection period of the first varied example. In addition to the first detection period Td1 and the second detection period Td2, a third detection period Td3 is set by the detection period setting unit 316 a third predetermined angle $\alpha_3$ leading the first detection period Td1, and a fourth detection period Td4 is set by the detection period setting unit 316 a fourth predetermined angle $\alpha_4$ lagging the second detection period Td2.

Based on the combination of levels of coil voltage detection signal S3 from the first detection period Td1 to the fourth detection period Td4, the current phase detecting unit 318 determines one of that (i) the current zero crossing point is positioned in the first status Φ1 leading the third detection period Td3, (ii) the current zero crossing point is positioned in the second status Φ2 lagging the third detection period Td3 and leading the first detection period Td1, (iii) the current zero crossing point is positioned in the third status Φ3 lagging the fourth detection period Td4, (iv) the current zero crossing point is positioned in the fourth status Φ4 lagging the second detection period Td2 and leading the fourth detection period Td4, and (v) the current zero crossing point is positioned in the fifth status Φ5 between the first detection period Td1 and the second detection period Td2.

Then, the driving signal synthesis unit 308 is configured to (i) delay a timing of the phase switch for a first adjusting angle $\theta_{ADJ1}$ relatively to the instant timing in the first status Φ1; (ii) delay the timing of the phase switch for a second adjusting angle $\theta_{ADJ2}$ relatively to the instant timing of the phase switch in the second status Φ2; (iii) advance the timing of the phase switch for a third adjusting angle $\theta_{ADJ3}$ relatively to the instant timing of the phase switch in the third status Φ3; (iv) advance the timing of the phase switch for a fourth adjusting angle $\theta_{ADJ4}$ relatively to the instant timing of the phase switch in the fourth status Φ4; and (v) maintain the timing of the phase switch as the instant timing of the phase switch in the fifth status Φ5.

According to the example, the phase information of the coil current $I_U$ may be precisely obtained by increasing the number of the detection periods.

Preferably, the following equations are established.

$$\theta_{ADJ1} > \theta_{ADJ2}$$

$$\theta_{ADJ3} > \theta_{ADJ4}$$

Under this situation, when the phase shift of the coil current $I_U$ is larger, the phase of the driving voltage $V_U$ is varied with a larger angle, and when the phase shift of the coil current $I_U$ is smaller, the phase of the driving voltage $V_U$ is varied with a smaller angle. Accordingly, the control speed is increased, and the precision is enhanced.

(Second Varied Example)

One or plural detection periods may also be all configured before or after the voltage zero crossing point, or be configured to include the voltage zero crossing point.

(Third Varied Example)

In this embodiment, in the coil voltage detection comparator 302, the threshold voltage, which is compared with the terminal voltage $V_U$, is set as the midpoint voltage $V_{COM}$ of a multi-phase coil, but the present disclosure is not limited thereto. For example, a divided voltage, i.e. a midpoint voltage $V_{CC}/2$, is obtained from the power source voltage $V_{CC}$ and the ground voltage $V_{GND}$ by the coil voltage detection comparator 302, and is used as the threshold voltage. In other words, the threshold voltage is set such that the direction of the coil current can be determined.

(Fourth Varied Example)

The Hall element 204 is used for detecting the voltage zero crossing point in this embodiment, but the present disclosure is not limited thereto. For example, the voltage zero crossing detecting unit 314 can also include a counter electromotive force detection comparator for comparing the terminal voltage $V_U$ and the midpoint voltage $V_{COM}$ of the coil when the terminal of the coil $L_U$ with a predetermined phase (U-phase, for example) of the brushless DC motor is in the status of high resistance.

Further, the detection of the detection period and the voltage zero crossing point may be performed at the point with the phase reversal of 180 degrees, or be performed by using coils with different phases. When the detection is performed at the same phase, a single comparator may be time-shared by the counter electromotive force detection comparator and the coil voltage detection comparator 302.

Alternatively, a coil, an encoder or a decomposer may be used for detecting a location of a rotor, i.e. a voltage zero crossing point.

(Fifth Varied Example)

The phase of the coil current $I_U$ and the phase of the induced voltage e are made consistent in this embodiment, but the present disclosure is not limited thereto. According to the type or use of motors, it would be a better situation in view of efficiency or torque that the phase is slightly shifted compared to the situation that the phases are identical. Under this situation, the target position of the phase of the coil current may be arbitrarily set by shifting the detection periods forward or backward relatively to the voltage zero crossing point.

(Sixth Varied Example)

The phase of the brushless DC motor is not limited, and can be a single phase, for example.

(Seventh Varied Example)

It is illustrated that the cooling device 200 is carried on the electronic machine for cooling the CPU in this embodiment, but the use of the present disclosure is not limited thereto. The present disclosure can be used for various applications for cooling a heat generating object. Furthermore, the driving device 300 of this embodiment is not limited to the use for driving a fan motor, and can be used for driving various motors.

The present disclosure is illustrated based on embodiments and with specific terms; however, the embodiments only represent the principle and applications of the present disclosure. It is understood that variations or changes of arrangements can be made to the embodiments and still fall within the scope of claims and spirit of the present disclosure.

What is claimed is:

1. A driving device configured for use with a brushless DC motor having at least one coil, the driving device comprising:
    a voltage zero crossing detecting portion, configured to detect an induction voltage generated from the coil with a predetermined phase of the brushless DC motor being zero of a voltage zero crossing point;
    a coil voltage detection comparator, configured to, in a detection period specified to include the voltage zero crossing point, compare a terminal voltage generated from one end of the coil with the predetermined phase with a threshold voltage, and generate a coil voltage detection signal indicating a comparison result;
    a driving signal synthesis portion, configured to generate a driving control signal based on the coil voltage detection signal, so as to make a phase of coil current flowing through the coil with the predetermined phase be the same with a phase of the induction voltage; and
    a driving circuit, configured to drive the brushless DC motor based on the driving control signal, and make one end of the coil with the predetermined phase in the detection period be in a status of high resistance;
    wherein the voltage zero crossing detecting portion comprises a Hall comparator for comparing a pair of Hall signals indicating a location of a rotor of the brushless DC motor from a Hall element, and for generating a Hall detection signal.

2. The driving device of claim 1, wherein the threshold voltage is a midpoint voltage of a polyphase coil.

3. The driving device of claim 1, wherein the threshold voltage is a divisional voltage of a power source voltage and a ground voltage.

4. The driving device of claim 1, wherein the voltage zero crossing detecting portion comprises a counter electromotive force detection comparator for comparing the terminal voltage and a midpoint voltage of the coil when the terminal of the coil with the predetermined phase of the brushless DC motor is in the status of high resistance.

5. The driving device of claim 1, wherein the brushless DC motor is a fan motor.

6. A cooling device, comprising:
a fan motor; and
the driving device of claim 1 for driving the fan motor.

7. An electronic machine, comprising the cooling device of claim 6.

8. A driving device configured for use with a brushless DC motor having at least one coil, the driving device comprising:
- a voltage zero crossing detecting portion, configured to detect an induction voltage generated from the coil with a predetermined phase of the brushless DC motor being zero of a voltage zero crossing point, and accordingly generate a detection result;
- a coil voltage detection comparator, configured to, in a detection period specified to include the voltage zero crossing point, compare a terminal voltage generated from one end of the coil with the predetermined phase with a threshold voltage, and generate a coil voltage detection signal indicating a comparison result;
- a driving signal synthesis portion, configured to generate a driving control signal based on the coil voltage detection signal and the detection result, and adjust the driving control signal according to a relationship between a phase of a coil current flowing through the coil with the predetermined phase and a phase of the induced voltage indicated by the coil voltage detection signal and the detection result, so as to make the phase of the coil current flowing through the coil with the predetermined phase be the same with the phase of the induction voltage; and
- a driving circuit, configured to generate the driving voltage according to the driving control signal adjusted according to the relationship between the phase of the coil current and the phase of the induced voltage, drive the brushless DC motor based on the driving control signal, and make one end of the coil with the predetermined phase in the detection period be in a status of high resistances;

wherein the voltage zero crossing detecting portion comprises a Hall comparator for comparing a pair of Hall signals indicating a location of a rotor of the brushless DC motor from a Hall element, and for generating a Hall detection signal.

* * * * *